United States Patent [19]
Elliott

[11] Patent Number: 5,907,489
[45] Date of Patent: May 25, 1999

[54] AUTOMATED FIXTURE BUILDER SYSTEM

[75] Inventor: Steven Elliott, Clinton Township, Mich.

[73] Assignee: MSX International Business Systems, Inc., Madison Heights, Mich.

[21] Appl. No.: 08/768,498

[22] Filed: Dec. 18, 1996

[51] Int. Cl.[6] .................................................. G06F 19/00
[52] U.S. Cl. ............................... 364/468.03; 364/468.09; 364/474.24; 364/512
[58] Field of Search ......................... 364/468.03, 468.04, 364/468.09, 468.1, 468.22, 468.24, 474.24, 468.21, 559, 512; 29/759, 559, 897.1–897.35, 406, 407, 418, 464–468, 703, 709, 714, 720, 721, 701, 702; 269/900; 395/919, 923; 345/964, 965

[56] References Cited

U.S. PATENT DOCUMENTS

| | | | |
|---|---|---|---|
| 5,033,014 | 7/1991 | Carver et al. | 364/474.24 X |
| 5,267,143 | 11/1993 | Pryor | 364/167.01 |
| 5,278,953 | 1/1994 | Saxon et al. | 395/161 |
| 5,343,611 | 9/1994 | Lager et al. | 29/559 |
| 5,347,471 | 9/1994 | Simon et al. | 364/474.35 X |
| 5,546,314 | 8/1996 | Brost et al. | 364/474.24 X |
| 5,586,052 | 12/1996 | Iannuzzi et al. | 364/474.24 X |
| 5,696,687 | 12/1997 | Demotte et al. | 364/468.21 |

*Primary Examiner*—Joseph Ruggiero
*Attorney, Agent, or Firm*—Harness, Dickey & Pierce, P.L.C.

[57] ABSTRACT

A system and method for constructing fixtures for holding physical parts for welding, checking, inspection, and other related activities is provided. The physical parts include parts of cars as may appear in an automotive plant. The optimum L-unit components are selected based on the contour of the part to be held, the principle locating points for the part, and the geometry of the various L-unit components. The principle locating points identify where on the part is a L-unit fixture to be placed. The program reads the part contour data and principle locating points data to construct the criteria by which to select the optimum L-unit components from a relational database. The program allows the user to preselect a L-unit component and then determine the other fixture components needed to adequately hold the part. Also provided for are multiple L-unit types including rest, pin, and clamp L-units, as well as combinations of the L-unit types.

40 Claims, 15 Drawing Sheets

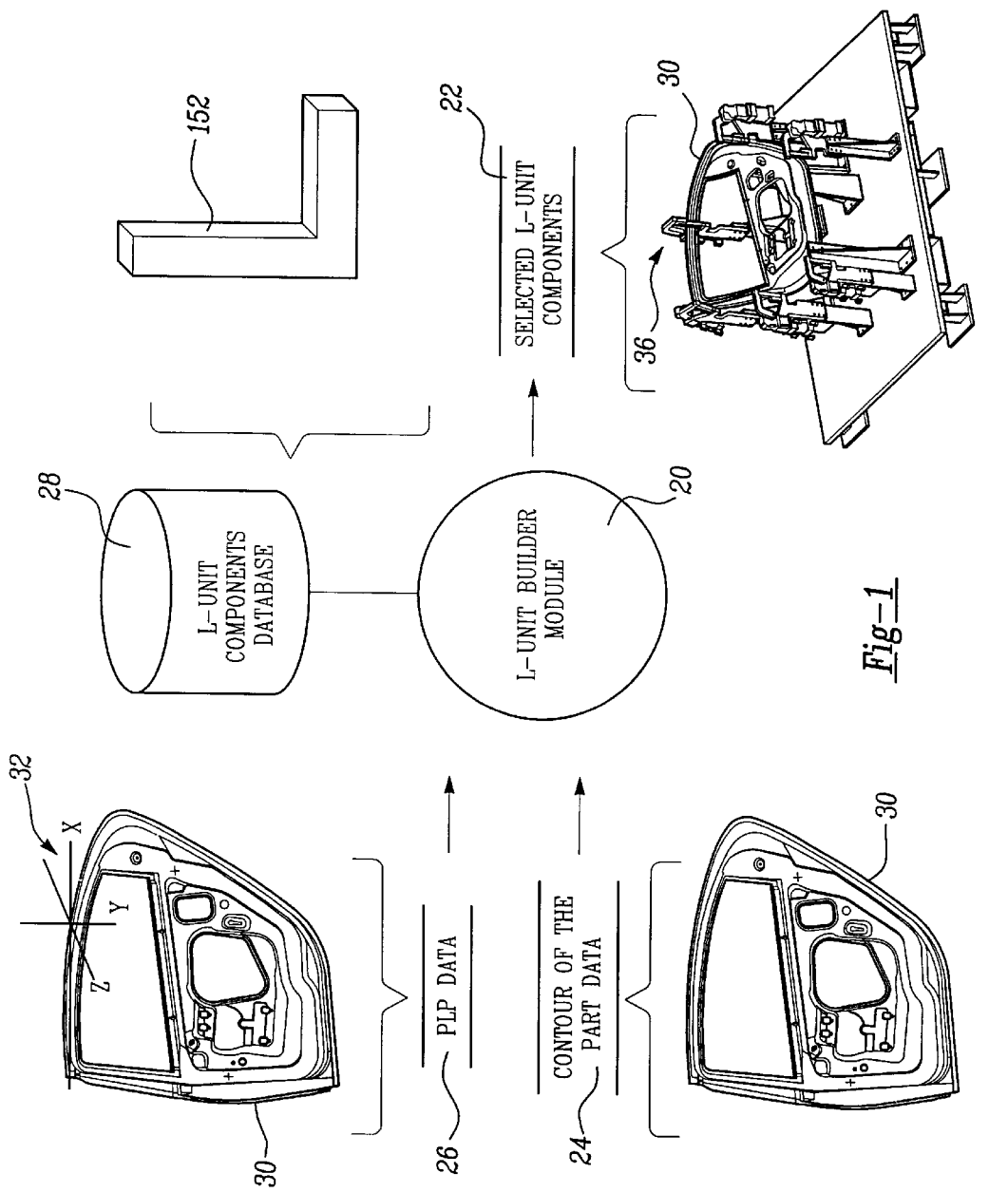

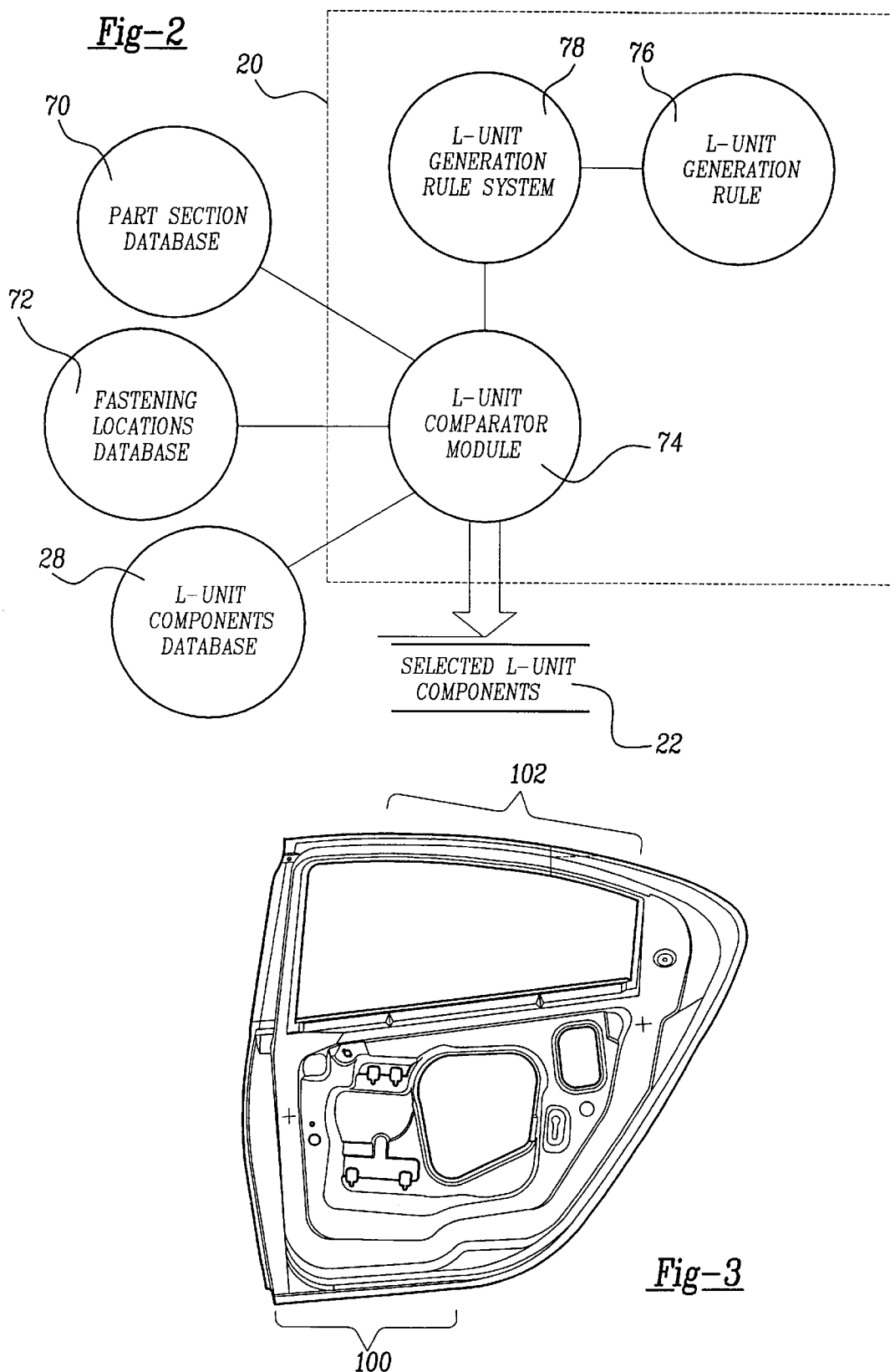

APX CLAMPMAKER INITIAL SETTINGS

☐ SPLIT VIEWPORTS  ☐ BYPASS MODIFICATION DIALOGS
☐ SHOW BODY LINES  ☐ SAVE EACH UNIT SEPARATELY

FILE: C:\APX_TEMP

CLIENT INFORMATION

TOOL INFORMATION
- TOOL NO.:
- TOOL INFO 1: PANEL-RR DOOR
- TOOL INFO 2: L/S - RT/LT
- MODEL YEAR:
- MODEL LINE:
- STATION NO.:

DEFAULTS
- FASTENER UNITS: METRIC
- FASTENER DISPLAY: NONE
- PF/NC WIDTH (mm): 24.00
- PF: SINGLE ADJ. TYPE: STD. w/ L-BLOCK
- NC: SINGLE ADJ. TYPE: STD. w/ L-BLOCK
- NC BACK UP: NORMAL TO BASE

CLAMPS
- MANUFACTURER:

CLAMP ARMS
- WIDTH: 25.40

SPACERS
- THICKNESS (mm): 5.0

L-BLOCKS
- TYPE: 2-DOWELS, 1-BOLT

L-UNIT PLP's

| # | TYPE | STATE | X | Y | Z |
|---|------|-------|------|------|------|
|   | BASE | ON | 0.0 | 0.5 | 0.0 |
| 1 | HND_CLAMP | ON | -573.0 | 814.5 | -23.0 |
| 2 | PWR_CLAMP | ON | 0.0 | 800.0 | 0.0 |
| 3 | PWR_CLAMP | ON | 462.0 | 596.7 | 291.0 |
| 4 | PWR_CLAMP | ON | 72.0 | 507.2 | 866.0 |
| 5 | PWR_CLAMP | ON | -695.0 | 517.3 | 901.0 |
| 6 | PWR_CLAMP | ON | -660.0 | 589.7 | 361.0 |
| 7 | REST | ON | -613.0 | 618.5 | 590.0 |
| 8 | REST | ON | 241.0 | 626.1 | 423.0 |
| 9 | PIN4 | ON | -555.0 | 612.5 | 646.0 |
| 10 | PIN2 | ON | 90.0 | 612.5 | 616.0 |

ON  OFF  SELECT ALL  CLEAR ALL

UCS: BASE  CHANGE TYPE

WORKING HEIGHT
- BASE TO LOWEST PLP: 507.23
- BASE TO HIGHEST PLP: 814.50

SETTINGS
- MAX DIRECTIONAL ADJ: 3
- MAX ANGLE-SINGLE ADJ: 5
- MAX ANGLE-CLAMP NORMAL TO BASE: 15

OK  CANCEL  HELP

APX International
(c) COPYRIGHT 1995
APX INTERNATIONAL

Fig-6

APX CLAMPMAKER: I-UNIT 6

CLAMP INFO
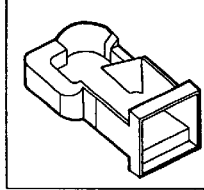
| | |
|---|---|
| MANUF. | DESTACO |
| MODEL | 993M |
| POSITION | 90 |
| TYPE | PNEUMATIC |

ROD PROXIMITY SWITCH
| | |
|---|---|
| MANUF. | NAMCO |
| MODEL | EE230-20420 |
| LOCATION | 3 |
| ORIENTATION | A |

CLAMP ARM
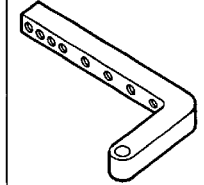
| | |
|---|---|
| ARM: | ACA048M |
| SIDE | RIGHT |
| ORIENTATION | ABOVE |
| OPENING | 57 |

BLIND PROXIMITY SWITCH
| | |
|---|---|
| MANUF. | NAMCO |
| MODEL | EE230-20420 |
| LOCATION | 3 |
| ORIENTATION | A |

993MA-R-ACA048M-90A-57-R3P0-C3P0

UPPER CONFIGURATION (485)
| L-BLOCK | VERT. ADJ. | HOR. ADJ. |
|---|---|---|
| 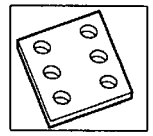 | 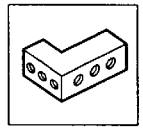 | 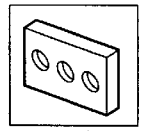 |
| ALB060M | ASP350 | ASP350 |

RISER SPACER
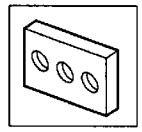
ACS650 BRACKET

ROD FLOW FITTING
| | |
|---|---|
| MANUF. | XXXX |
| MODEL | XXXX |
| LOCATION | 2 |
| ORIENTATION | A |

LOWER CONFIGURATION
| L-BLOCK | VERT. ADJ. | HOR. ADJ. |
|---|---|---|
| 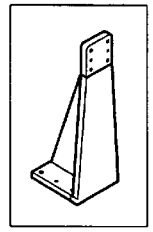 | 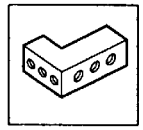 | 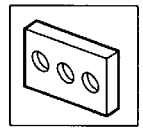 |
| ALB060M | ASP350 | ASP350 |

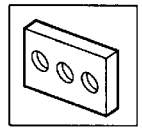
ARA450M

BLIND FLOW FITTING
| | |
|---|---|
| MANUF. | XXXX |
| MODEL | XXXX |
| LOCATION | 2 |
| ORIENTATION | A |

| | |
|---|---|
| HEIGHT OF PLP FROM BASE: | 589.67 |
| HEIGHT OF PRESSURE FOOT: | 94.23 |
| ANGLE OF PART SURFACE AT PLP | 0.49 |
| ANGLE FROM PLP TO ARM PIVOT | 0.30 |
| ANGLE OF CLAMP ARM | 0.00 |
| MAX. ANGLE-CLAMP NORM. TO BASE: | 15.00 |

[ ACCEPT ] [ UPDATE ] [ CANCEL ] [ SHADE < ] [ HELP... ]

1 WARNING MESSAGE(S): PRESS HELP KEY FOR DETAILS.

CUSTOMER: 490 | TOOL NO. PANEL-RR DOOR I/S-RT/LT | BILL OF MATERIAL PAGE # OF

| FIXTURE # | DETAIL # | SHEET # | QUANT. | DECRIPTION | MANUFACTURER | MATERIAL | CATALOG | NOTES |
|---|---|---|---|---|---|---|---|---|
| 2 | XX | XX | 1 | POWER CLAMP | | N/A | 993A-R-ACA044-90A-78-R3P0-C3P0 | -- |
| 2 | XX | XX | 1 | UPPER L-BLOCK | | 1018 OR 1020 | ALB040M | -- |
| 2 | XX | XX | 1 | LOWER L-BLOCK | | 1018 OR 1020 | ALB040M | -- |
| 2 | XX | XX | 1 | ARM SPACER | | 1018 OR 1020 | ASP350 | -- |
| 2 | XX | XX | 1 | PF SPACER | | 1018 OR 1020 | ASP350 | -- |
| 2 | XX | XX | 1 | NC SPACER | | 1018 OR 1020 | ASP350 | -- |
| 2 | XX | XX | 1 | BLADE SPACER | | 1018 OR 1020 | ASP350 | -- |
| 2 | XX | XX | 2 | RISER SPACER | | 1018 OR 1020 | ACS350S | -- |
| 2 | XX | XX | 1 | RISER L-BRACKET | | 1018 OR 1020 | ARA600M | -- |
| 2 | XX | XX | 1 | BLADE | | 1018 OR 1020 | N/A | -- |
| 2 | XX | XX | 2 | FLOW FITTINGS | | N/A | XX | -- |

MODEL YR. | CAR LINE: | STATION NO.

AUTOMATED FIXTURE BUILDER SYSTEM

BACKGROUND OF THE INVENTION

1. Field of the Invention

The present invention relates generally to computer aided design/computer aided manufacturing (CAD/CAM) and more particularly to a computerized automated fixture set up system for automating the design of the fixture.

2. Discussion

Fixtures are common throughout the automobile industry. They are typically used to hold in place car parts for workmanship or quality checks. Different fixtures are assembled to suit the individual geometry of each type of car part. When a car part is redesigned (for example, due to yearly car model changes), so too must the fixture that holds the car part in place be redesigned.

Current fixture design practice is painstaking and laborious in nature. A typical fixture redesign may take two weeks of design effort due to the number of fixture design factors involved. For example, the fixture design factors entail providing enough of a clamp opening to allow clearance for inserting and removing of the part from the fixture assembly, while also keeping the car part from interfering with the other components of the fixture.

Moreover, if the fixture designer wishes to select a different fixture component to resolve a discovered interference condition, the different fixture component may produce new interference conditions. This will necessitate further redesigns and results in the fixture building process to take a long time, such as several weeks.

SUMMARY OF THE INVENTION

The present invention is a computer-implemented apparatus for building a fixture to hold a physical part. The fixture includes L-units. The L-unit includes L-unit components. Both the L-unit components and the part have geometric dimensional characteristics. The apparatus includes a fastening locations database for storing fastening locations of the physical part. L-unit components database stores the geometric dimensional characteristics of the fixture components, and a part section database stores the geometric dimensional characteristics of the physical part. L-unit generation rule system includes fixture generation rules which establish criteria for selecting the fixture components. The criteria is based on the geometric dimensional characteristics of the physical part and the fastening locations. A L-unit comparator module which is coupled to the part section database and to the fastening locations database and to the components database and to the L-unit generation rule system selects those L-unit components from the L-unit components database which satisfy the L-unit component criteria to hold said part. The present invention reduces the time involved to build a fixture from the typical few weeks down to 15 or 30 minutes. Such a reduction in time has significant commercial ramifications.

BRIEF DESCRIPTION OF THE DRAWINGS

Additional advantages and features of the present invention will become apparent from the subsequent description and the appended claims, taken in conjunction with the accompanying drawings, in which:

FIG. 1 is a flow diagram showing the top level data inputs and outputs of the present invention;

FIG. 2 is an entity relationship diagram illustrating the relationships among the various features of the present invention;

FIG. 3 is a three dimensional view of a car part to be held by a fixture;

FIG. 6 is a display of an initial data entry screen;

FIG. 11 is a display showing the selected L-unit components;

FIG. 13 is a table illustrating a possible output for which L-unit components have been selected according to the present invention.

DESCRIPTION OF THE PREFERRED EMBODIMENTS

Figure 4A:
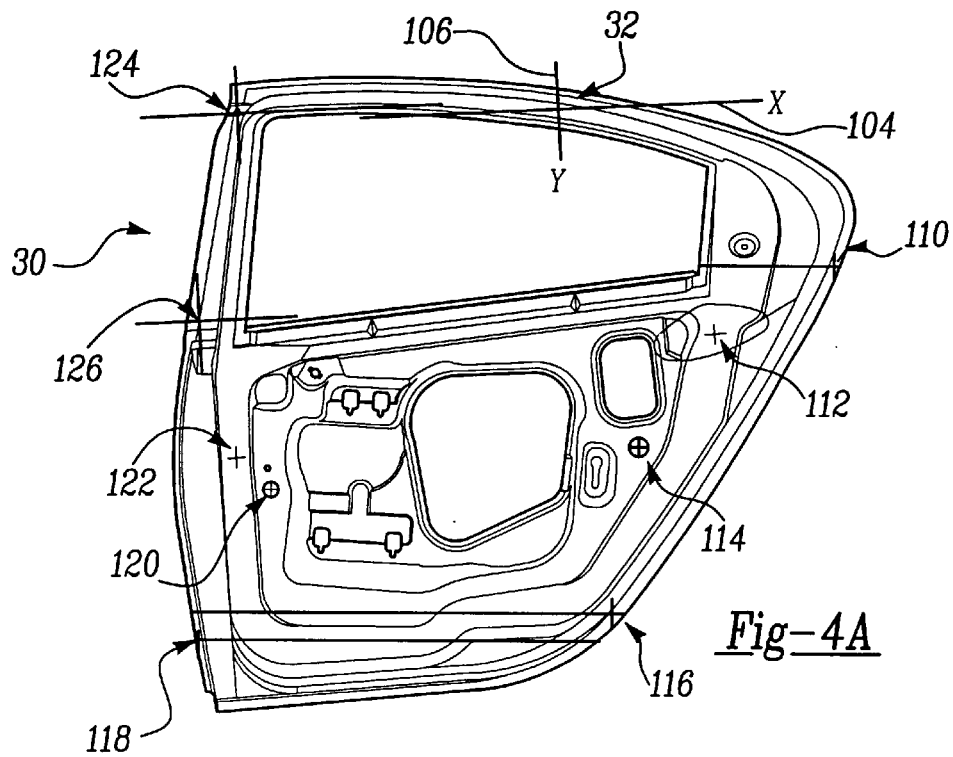
FIG. 4A is a three dimensional view of the car part with PLP blocks indicated.

FIG. 1 shows the top level inputs used by the L-unit builder module 20 to select L-unit components for holding a part 30. The top level inputs include the contour of the part data store 24, the principal locating points data (PLP data store 26), and the L-unit components database 28.

The contour of the part data store 24 contains the geometric data which defines the shape of the part 30. The part 30 is typically a sheet metal car part which needs to be held in place by one or more L-units for welding, checking, inspection and other related activities.

The PLP data store 26 contains geometric data that designates the locations on the part 30 which need to be held by L-units. The PLP 32 which is to receive a clamp fixture is shown. The geometric data for designating a PLP is typically expressed in a three dimensional coordinate system (e.g. x, y, z). The type of L-unit—such as a rest type of L-unit or a clamp L-unit—to be used at a PLP is also stored.

The L-unit components database 28 contains various L-unit components which can be assembled for holding the part 30 for subsequent workmanship. This database contains the geometric data necessary to adequately define each L-unit component within the database, such as a blade 38 as shown in FIG. 1.

The L-unit builder module 20 selects those L-unit components database 28 that satisfy certain criteria based upon the information in the PLP data store 26 and the contour of the part data store 24. These selected L-unit components are placed in the selected L-unit components data store 22. A clamp L-unit 36 as assembled from the selected L-unit components data store 22 is shown in FIG. 1 and is inserted at the point designated by PLP 32.

FIG. 2 shows one possible arrangement to implement the present invention. The part section database 70 is used in the preferred embodiment to hold the data for the contour of the parts data store 24. The fastening locations database 72 may be used to hold the data for the PLP data store 26. These two databases and the L-unit components database 28 are connected to the L-unit comparator module 74. The L-unit comparator module 74 selects those L-unit components from the L-unit components database 28 which satisfy the data contained in the part section database 70 and the fastening locations database 72. The L-unit comparator module 74 uses the L-unit generation rules 76 of the L-unit generation rule system 78 to establish the criteria which underlies the comparison. The comparison done by the L-unit comparator module 74 selects the L-unit components for storage in the selected L-unit components data store 22. The L-unit comparator module 74, the L-unit generation rule system 78 which contains the fixture generation rules 76 comprise the L-unit builder module 20.

FIG. 3 shows a three dimensional view of a part 30 which is to be held by L-units. In this example, the part is a right rear door of an automobile. It should be understood that the present invention should not be limited to the part displayed in FIG. 3 but also encompasses many other types of parts whether they be from an automobile or from some other type of machine.

The contour of the part 30 can be represented as geometric data for storage in the contour of the part data store. In the preferred embodiment, the geometric data assumes the format of: $(x_1, y_1, z_1)-(x_2, y_2, z_2)$. Such a geometric data format defines the line segment 100 which defines one contour of the part 30. When the contour assumes a relatively nonlinear form, then alternate geometric data formats are used, such as curvilinear data formats. For example, if the contour of the part is best represented as a circle, then the contour's data format is a center point and a radius. If the contour of the part is best represented as an arc as for example at arc 102, then the contour's data format is a center point, a radius, a start angle, and an end angle. With these various geometric data formats, a part's contour can be represented with a great deal of smoothness and resolution. It should be understood that the present invention should not be limited to these types of geometric data formats, as it also includes other geometric data formats. In the preferred embodiment, the geometric data is stored in a CAD/CAM drawing file, such as AutoCAD by Autodesk, Inc.

FIG. 4A shows a three dimensional view of a portion of the part 30 along with a PLP (principal locating points). The PLP designates the location where a L-unit is to fasten onto the part 30 in three dimensional space. The PLP is expressed as geometric data in the form of (x, y, z). A PLP 32 is shown which is the origin point for x-axis 104 and y-axis 106. Moreover in the preferred embodiment, the PLP designates a part section which is a plane existing in the x-y plane of the PLP and is limited by the outermost points of the part 30 at that PLP. These outermost points will determine what L-unit components can be selected for a particular type of L-unit. The PLP locations define such key locations on the part 30 as the edge of the part 30 which needs to be clamped, or the center of the part where a hole has been provided for a pin.

In addition to a PLP coordinate being designated for each section, the type of L-unit to be used at each PLP is also designated. The fixture types include a rest type of L-unit, a pin type of L-unit, base, or a clamp type of L-unit. It is to be understood that the present invention is not limited to these types of fixtures but may include other types.

For this particular example, the following PLPs of FIG. 4 are to receive clamp type of L-units: PLP 32; a PLP 110; PLP 116; PLP 118; PLP 126; and PLP 114. PLP 112 and PLP 120 receive pin type of L-units. PLP 112 and PLP 122 receive rest type of L-units.

The preferred embodiment uses a "PLP-block" to indicate the part section centered about the PLP. A PLP-block is inserted at the coordinates of the PLP, with the x-axis aligned along the surface of the part, and with the positive y-axis pointing away from the base. The x-axis points in the desired direction of the pivot point if the L-unit is a clamp. The PLP-block provides the means for locating the PLP and, if needed, the slope of the surface of the part. Another PLP-block is inserted to designate the surface location of the base of the fixture. This block is oriented with the positive y-axis pointing away from the base (usually upwards). Its position relative to the x- and zaxis is usually not a determining factor but should typically be placed around the center of the fixture.

Figure 4B:
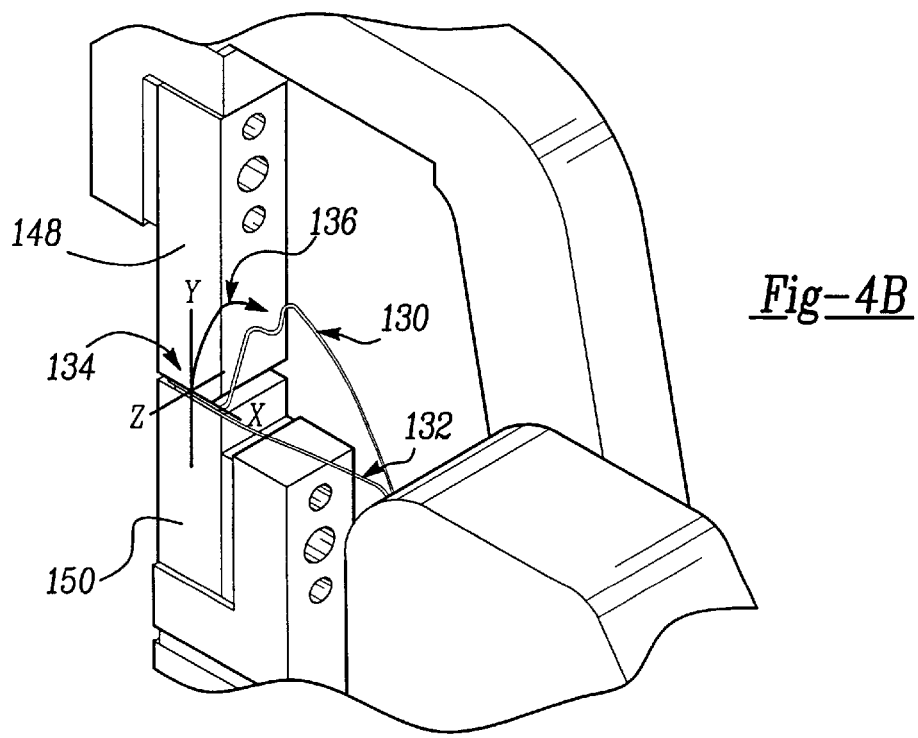
FIG. 4B is a three dimensional partial view of an L-unit showing the orientation of a PLP block.

FIG. 4B is a three dimensional depiction of a portion of a clamp type of L-unit. The NC pressure foot 148 and the NC backup 150 hold two parts (part one 130 and part two 132) of a car for welding at PLP 134. The contour of a part is determined in the following way and is similar for the all types of L-units. With the initial point being the PLP point, the computer program goes out a variable amount (typically set to 50 millimeters) along the positive x-axis direction and comes back to the PLP along the same path but in 1 millimeter increments. Then, the computer program goes out the same distance in the negative x-axis direction, also in 1 millimeter increments.

At each of those 1 millimeter increments the surface of the part is determined. For this situation, the contour of both part one 130 and part two 132 are determined. The data gathered for the contour of the parts includes the outer boundary of the parts. If the PLP 134 is for a clamp type of L-unit, then the clamp angle 136 of the part is determined from this data. This clamp angle 136 is the angle formed along the positive x-axis to a line segment which points from the origin of the PLP to the pivot of the arm. The clamp angle 136 is used so that the L-unit components do not interfere with the part to be clamped.

If the PLP 134 is for a pin type of L-unit, then the surface data generated includes the boundary locations of the hole into which the pin is to be inserted.

Figure 5A:
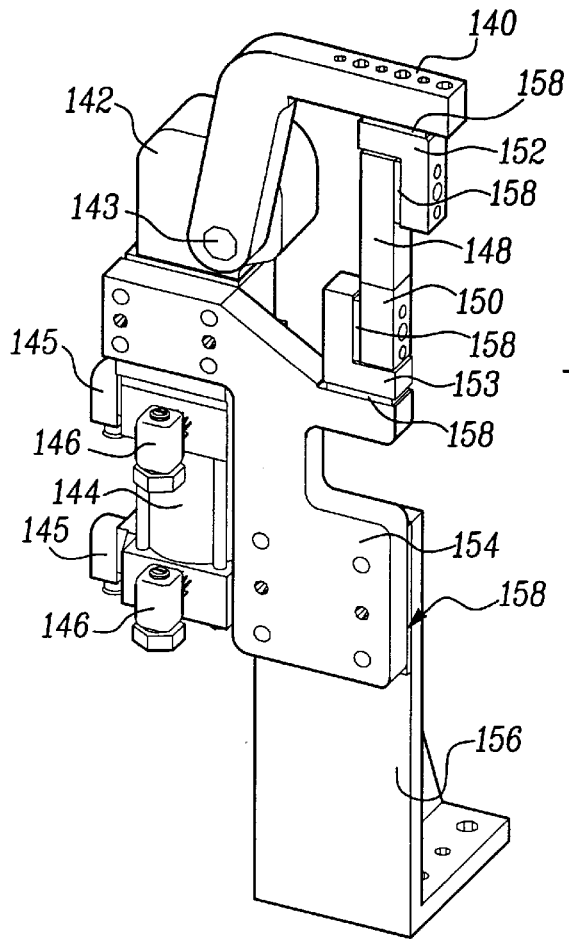
FIG. 5A is a three dimensional view of a clamp L-unit.

FIG. 5A shows a three dimensional view of an assembled set of a clamp L-unit components which are stored in the L-unit components database. This figure serves to define some of the L-unit components that may be contained in the L-unit components database 28. One component that may be in the L-unit components database 28 is the arm 140 of the L-unit. Moreover, a clamp head 142 and a clamp cylinder 144 which together form a clamp may be additional parts within the L-unit components database 28. Proximity sensor switches 145 indicate if the clamp is open or closed. Air flow controls 146 control how quickly the clamp opens or closes. Other parts include the NC pressure foot 148 and the NC backup 150. Upper and lower L-blocks (152, 153) are shown as well as a blade 154. The bottom most component of the L-unit in FIG. 5 is the riser bracket 156 which is also known as an "L-bracket" within the field of the invention. Spacers 158 may be included to adjust various L-unit components to the proper height and orientation as needed by specific sections of a part. It should be understood that the present invention may include other L-unit components.

Figure 5B:
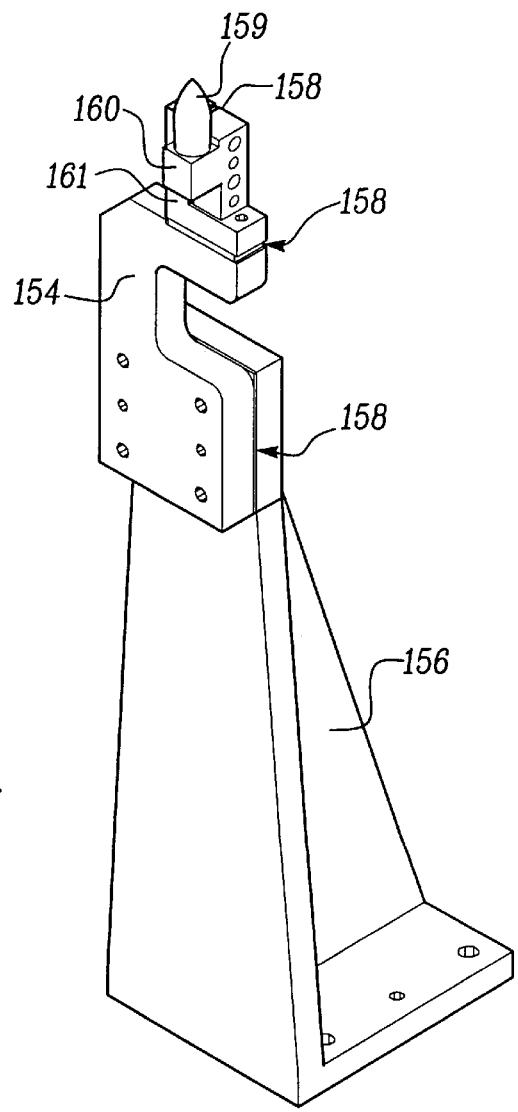
FIG. 5B is a three dimensional view of a pin type of L-unit.

FIG. 5B shows a three dimensional view of an assembled pin type of L-unit. It includes a pin 159, a pin retainer 160, an L-block 161, a blade 154, and a riser 156. As before, spacers 158 are used for horizontal, vertical and/or lateral adjustment.

Figure 5C:
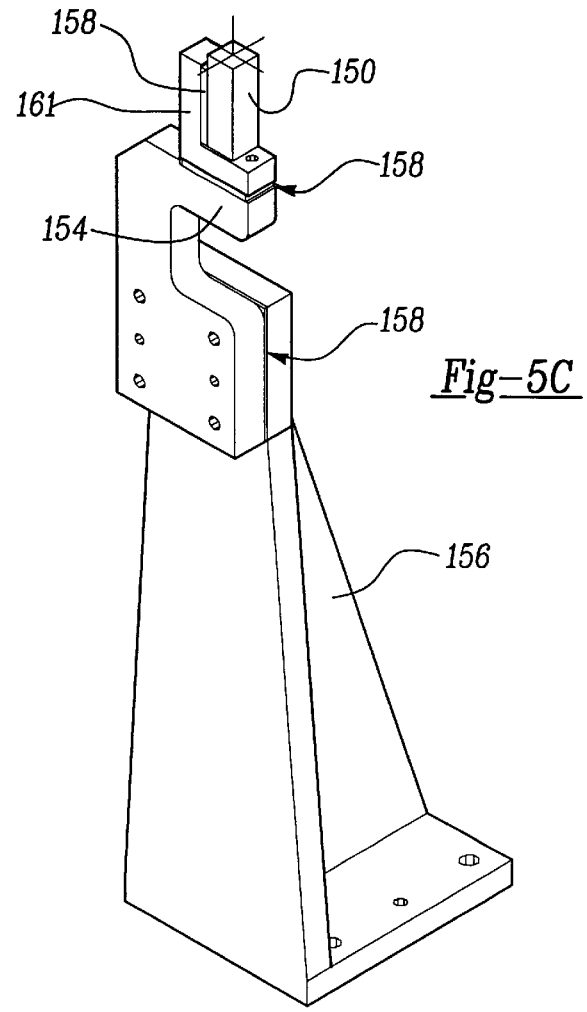
FIG. 5C is a three dimensional view of a rest type of L-unit.

FIG. 5C shows a three dimensional view of an assembled rest type of L-unit. It includes an NC backup 150, an L-block 161, a blade 154, and a riser 156. As before, spacers 158 are used for horizontal, vertical and/or lateral adjustment.

Figure 5D:
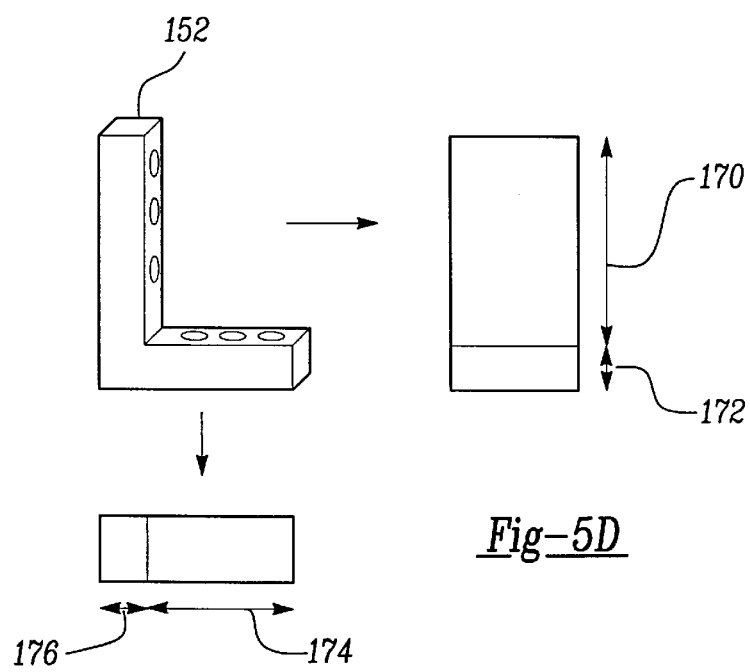
FIG. 5D is a two dimensional view of a L-unit component showing geometric information of the L-unit component.

FIG. 5D shows a two dimensional view of one of the L-unit components known as an L-block 152. The geometric data which defines the dimensions of the L-block 152 is stored within the L-unit components database 28. The geometric data is in the format of line segment data, and if required, then curvilinear data formats are used.

FIG. 6 shows a display of the data entry screen for the present invention. Clamps can be specified at subwindow 177. The width of clamp arms can be specified at subwindow 178. The thickness of the spaces can be specified at subwindow 179. The type of L-blocks can be specified at subwindow 180.

Moreover within subwindow 181, several additional defaults can be selected by the user, such as: the fastener units; the fastener display, the width of the Pressure Foot and NC back-up blocks; the type of Pressure Foot NC block adjustment to be used; the type of NC back-up adjustment (n.b. these determine whether L-blocks and/or spacers are used) and the orientation of the NC Backup.

Figure 7:
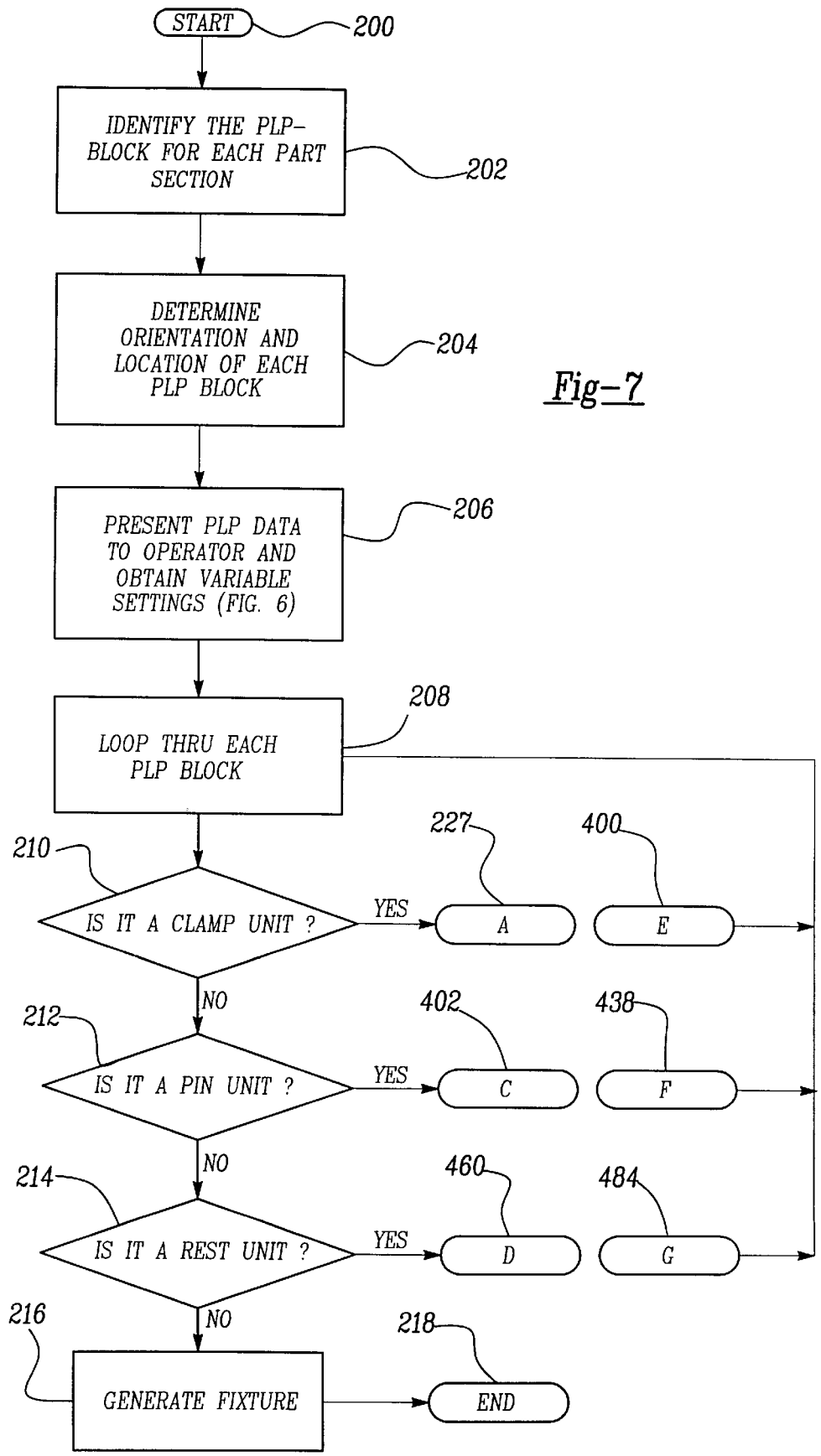
FIG. 7 is a flow chart showing the top-level functions.

Referring to FIG. 7, the present invention begins its operation at the start block 200. Following the rules as expressed in the L-unit generation rule system, the present invention identifies the PLP for each part section at block 202 based on the PLP data that is stored in the PLP data store 26. Block 204 determines the orientation data for each PLP block. Block 206 presents the PLP data to the operator in a format similar to the screen of FIG. 6.

Block 208 loops through the following steps for each PLP block. First, decision block 210 determines if the PLP block is a clamp unit. If it is, then processing continues at the continuation block A 227.

If the PLP block is not a clamp unit, then decision block 212 checks of the PLP block is a pin unit. If it is, then processing continues at continuation block C 402. If it is not, the decision block 214 checks if the PLP block is a rest unit. If it is, then processing continues at continuation block D 460. If all the PLP blocks have been processed, the overall fixture is generated at block 216. Thereupon processing terminates at the end block 218.

Figure 8A:
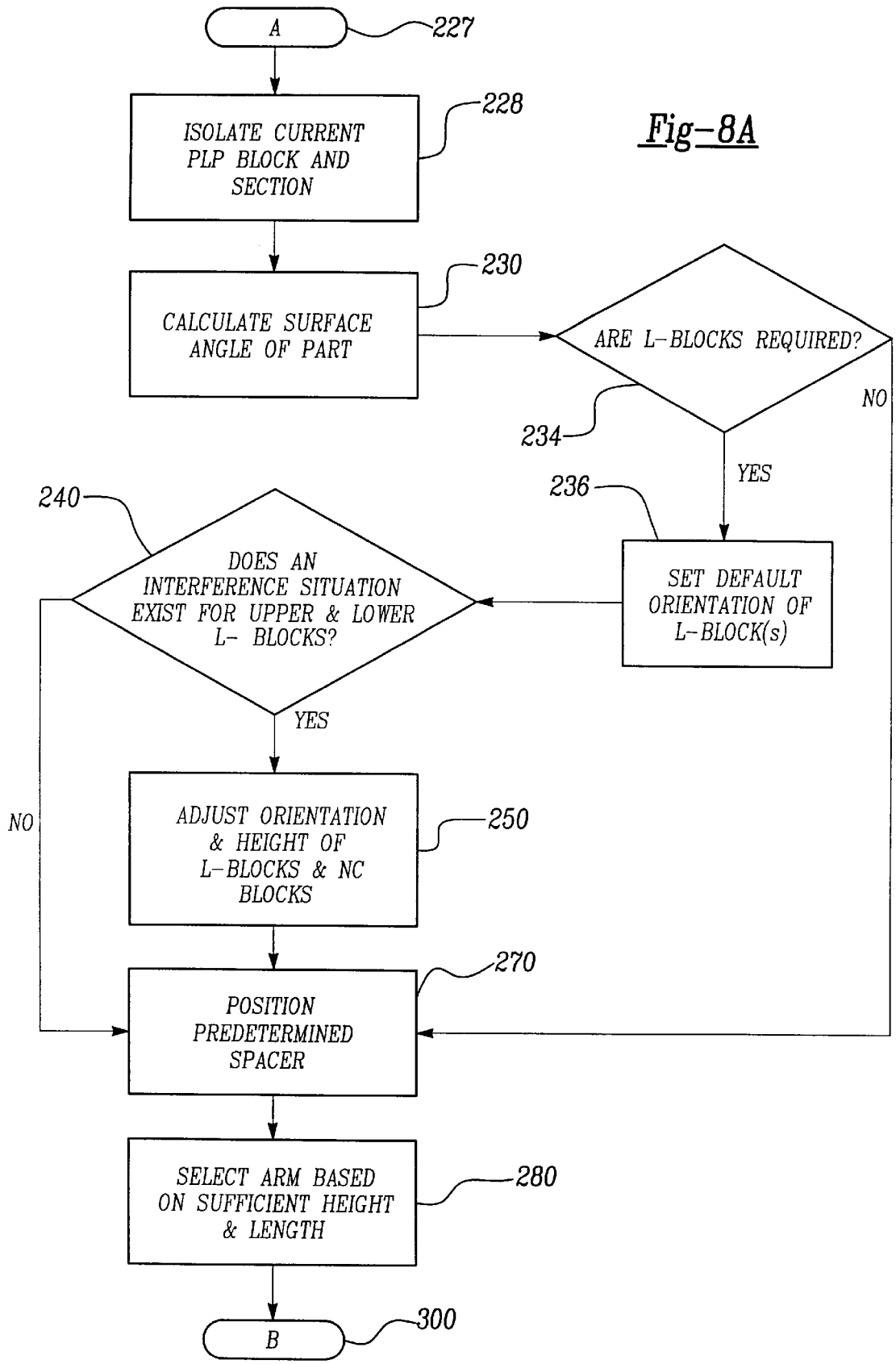
FIGS. 8A and 8B are flow charts detailing the functional operations which generate a fixture clamp.

Referring to FIG. 8A, if processing is to continue at continuation block A 227, then block 228 is executed in order to isolate the current PLP block and sections. This isolation is done so that block 230 can execute.

The data is then used by block 230 to calculate the surface angle of the part based on the data obtained from the orientation data. Decision block 234 inquires whether any L-blocks are required by determining if there is more than a 15 degree slope in the part surface (the 15 degrees threshold value was selected by the user in subwindow 182 on the display of FIG. 6. If there is more than a 15 degree slope in the part surface, then L-blocks will be used and processing continues at block 236. If there is 15 degrees or less, then processing continues at block 270. Depending on the direction of the surface slope, block 236 sets the orientation of the upper and lower L-blocks. Block 240 looks at the height of the part from the part section and checks for interference between the part and the upper L-block in its default placement. In the preferred embodiment, the data for the edges of the L-unit components are stored in a relational database, which is queried using the SQL2 database language in the preferred embodiment. If block 240 determines that an interference condition does not exist then processing continues at block 270. However, if block 240 does determine that an interference condition exists, it then adjusts the orientation and height of the L-blocks and the NC pressure foot and NC backup at block 250.

Block 250 either raises the L-block for clearance or rotates the L-blocks to the opposite side of the PLP block. Appendix A contains the code which exemplifies how the L-block is processed by block 250.

Block 270 positions the predetermined spacers around the L-blocks and NC components. Block 280 analyzes the portion of the part section between the PLP and the clamp and selects an arm that has enough offset (that is, height) to accommodate connection to the upper L-block and also has enough length to accommodate clearance to the clamp. Such an arm that satisfies these criteria is selected from the L-unit components database 28. Appendix B contains the code which exemplifies how the arm is processed by block 280.

Figure 8B:
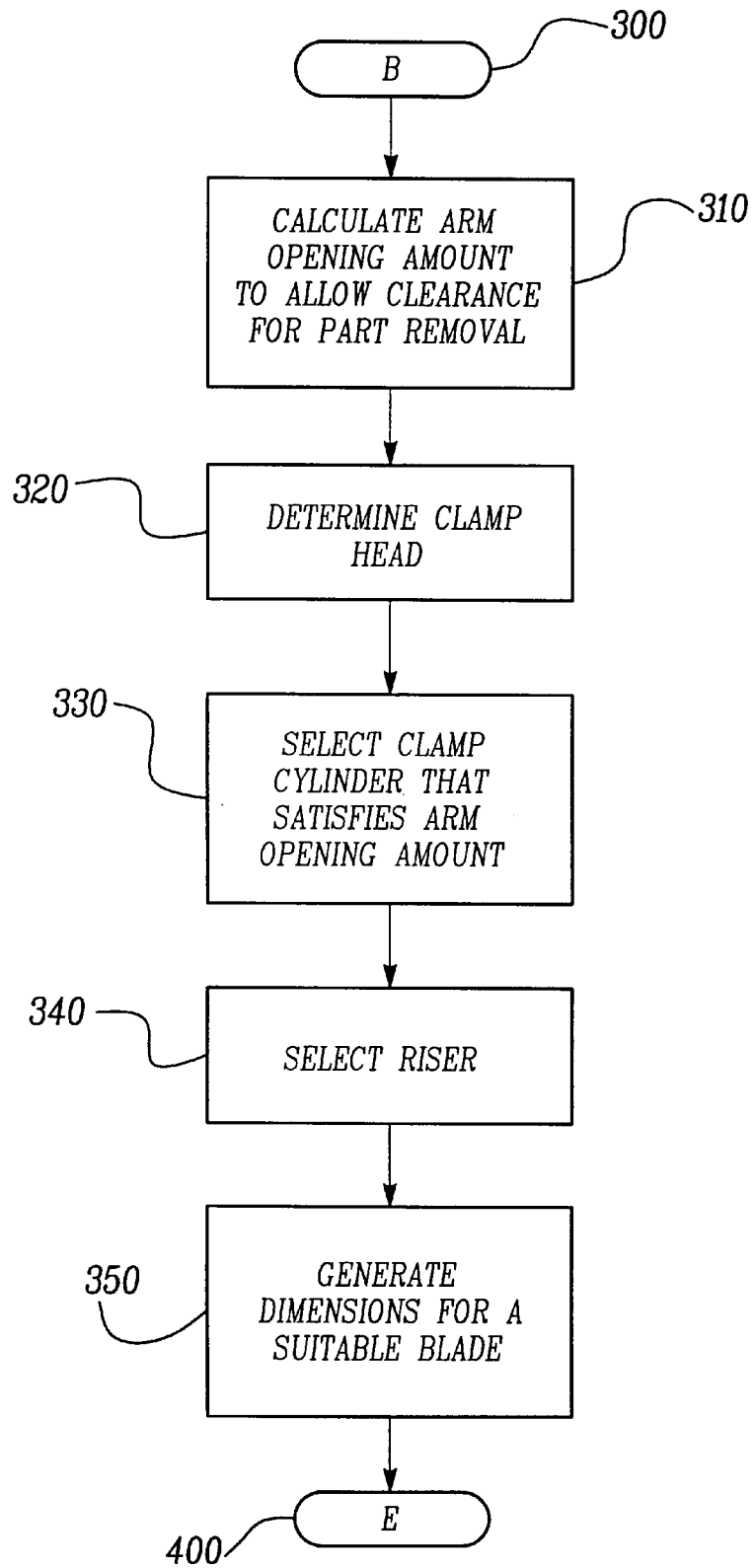

Processing continues at continuation block B 300 on FIG. 8B. Block 310 examines the edge of the part and calculates the amount of arm opening necessary to allow clearance for part removal. The clamp head is determined at block 320 based on the calculated amount of arm opening. Next, block 330 selects a clamp cylinder that satisfies the arm opening amount that was determined in block 310. A "select" database command with the criteria based on arm opening amount is performed upon the L-unit database 28. Both of these clamp components are placed in the selected L-unit components data store 22. At block 340 a riser bracket which is a mounting L-bracket is selected according to the height and relative position of the clamp and lower L-block. A riser bracket that satisfies this criteria is selected from the L-unit components database 28 and inserted into the selected L-unit components data store 22. Block 350 analyzes the lowest edge of the part, the position of the lower L-block, the clamp, and the riser bracket to generate the dimension for a connecting entity (that is, a blade) to which other L-unit components mount, while taking into consideration screw removal clearance, part clearance and L-unit stability. The generated blade is placed in the selected L-unit components data store 22. Processing continues at continuation block E 400 upon FIG. 7.

For the preferred embodiment, the dimensions for the NC blocks and the blade are calculated for each particular situation. The NC blocks and the blade are not standardized fixture components whose dimensions are stored in the L-unit components database, but rather their dimensions are determined at run-time in accordance with the procedure described in FIGS. 8A and 8B. This is true for the blades used in the other types of L-units—such as pin L-units and rest L-units.

Figure 9:
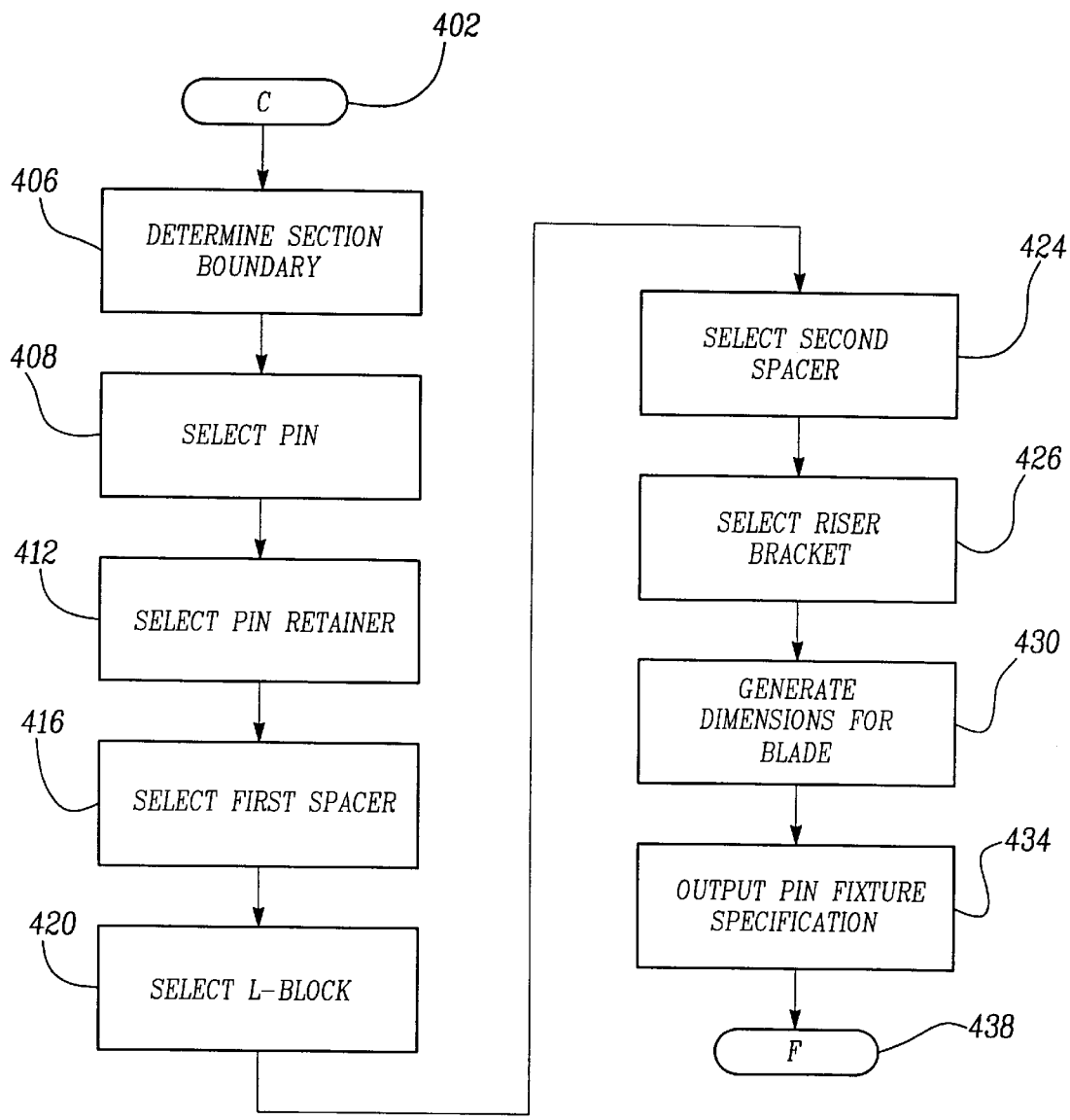
FIG. 9 is a flow chart detailing the functional operations which generate a pin type L-unit.

FIG. 9 is a flowchart detailing how a pin L-unit is generated if a particular PLP is to have a pin type of L-unit. Continuation block C 402 indicates that block 406 is to be executed. At block 406, the boundary of a section associated with a PLP-block is determined in order to find where the edges of the pin locator hole are (i.e., determines the size of the hole with one mm increments across the part's contour. A part which is to receive a pin L-unit contains a hole where the pin is to hold the part in place. Block 408 selects a pin from the L-unit components database which has an outside diameter that best matches the size of the pin locator hole. Once the pin is selected, a pin retainer at block 412 is chosen from the L-unit components database to hold the pin. A pin retainer which provides clearance of the L-unit from the part is selected.

Block 416 selects by default (as specified in the data entry screen of FIG. 6) a first spacer. Block 420 selects an L-block from the parts database based upon which one would be compatible with the previously selected pin retainer so that the pin retainer is coupled to the blade. Block 424 selects a second spacer if additional height for clearance is needed. Block 426 selects a riser bracket which is chosen according to the height location of the previously selected components. At block 430 a blade is generated to connect the riser bracket to the other components. Block 434 produces output to show which L-unit components have been selected for the pin fixture. The pin L-unit generation routine then branches to continuation block P 438 on FIG. 7.

Figure 10:
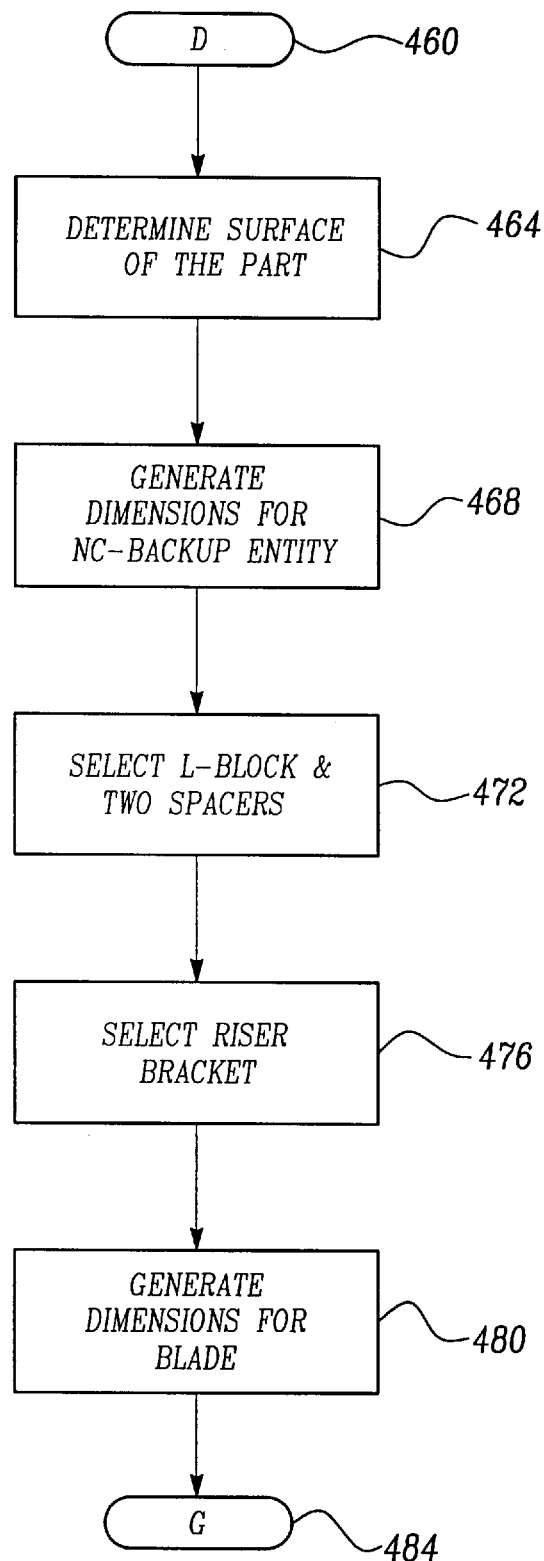
FIG. 10 is a flow chart detailing the functional operations which generate a rest type L-unit.

FIG. 10 is a flowchart detailing how a rest L-unit is generated if a PLP is to have a rest type of L-unit. Continuation block D 460 designates that at block 464 the PLP-block is considered to determine where the surface of the part is. Block 468 generates an NC-backup entity, along with an L-block and two spacers at block 472 in a manner similar to the method used in selecting them for a clamp fixture. A riser bracket is selected at block 476 according to the height location of the previously selected components. Block 480 generates a blade whose dimensions allow the blade to connect the riser bracket with the other components. Processing then branches to continuation block G 484 on FIG. 7.

Referring to FIG. 11, after an L-unit has been generated, the user has the option to change the configuration of the L-unit. The user may select a different type of the same part with different dimensions. For example, a different type of L-block can be selected at subwindow 485. Upon selection of a different part, the present invention recalculates the L-unit with the new part.

Figure 12:
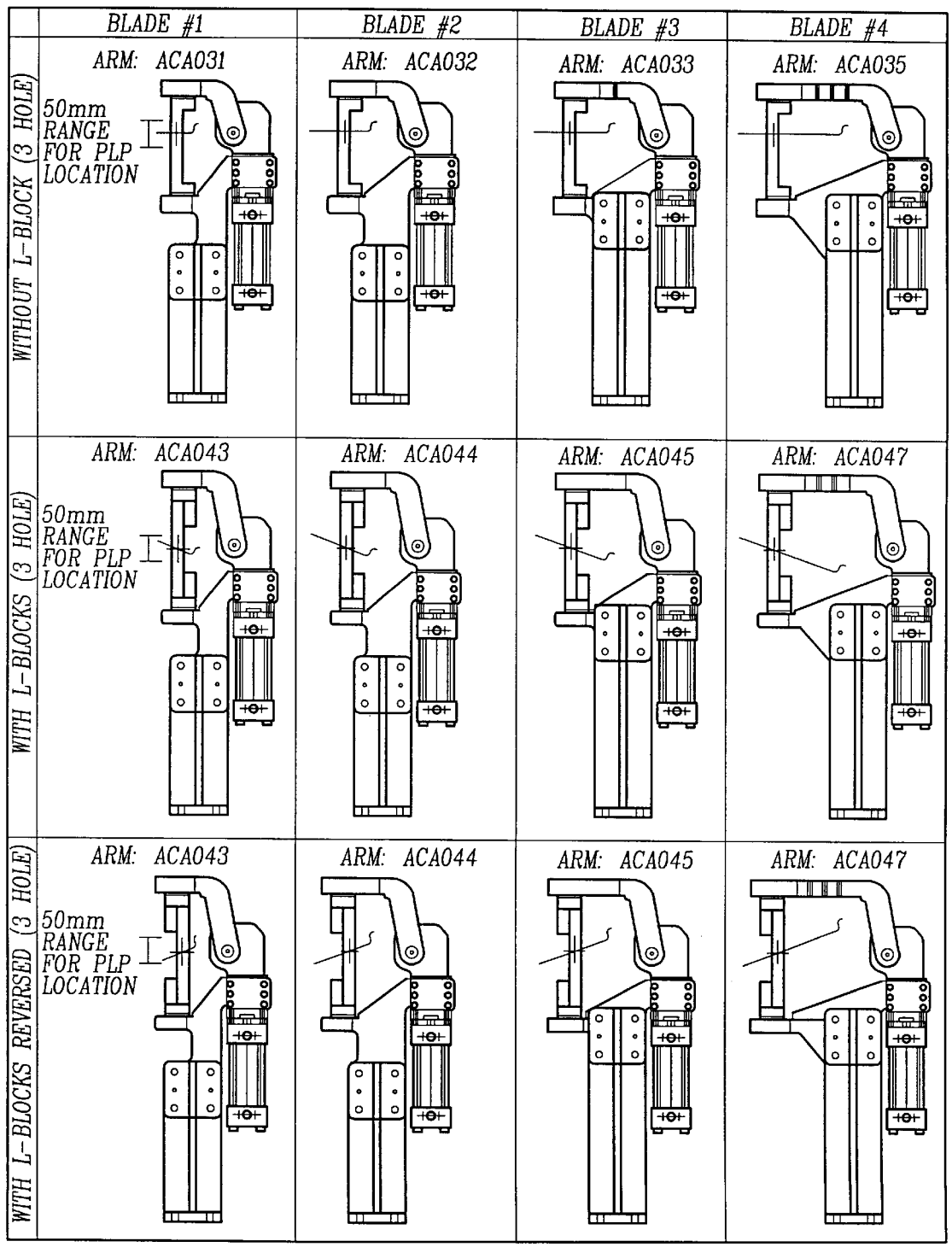
FIG. 12 is a set of 2-dimensional clamp fixtures which shows the use of the present invention for considering alternatives.

FIG. 12 shows different configurations for an L-unit where the blades' dimensions and L-block configurations are varied. Using the present invention, the determination of these different alternatives took about one hour. Using the prior systems, the same set of alternatives typically would have taken a week or two.

Various output formats exist to show the selected fixture components, such as: a three-dimensional drawing for custom machine details; a bill of material showing fixture components and part ordering information; individual L-unit assembly drawings; L-unit section drawings; and a fixture assembly drawing.

Figure 14:
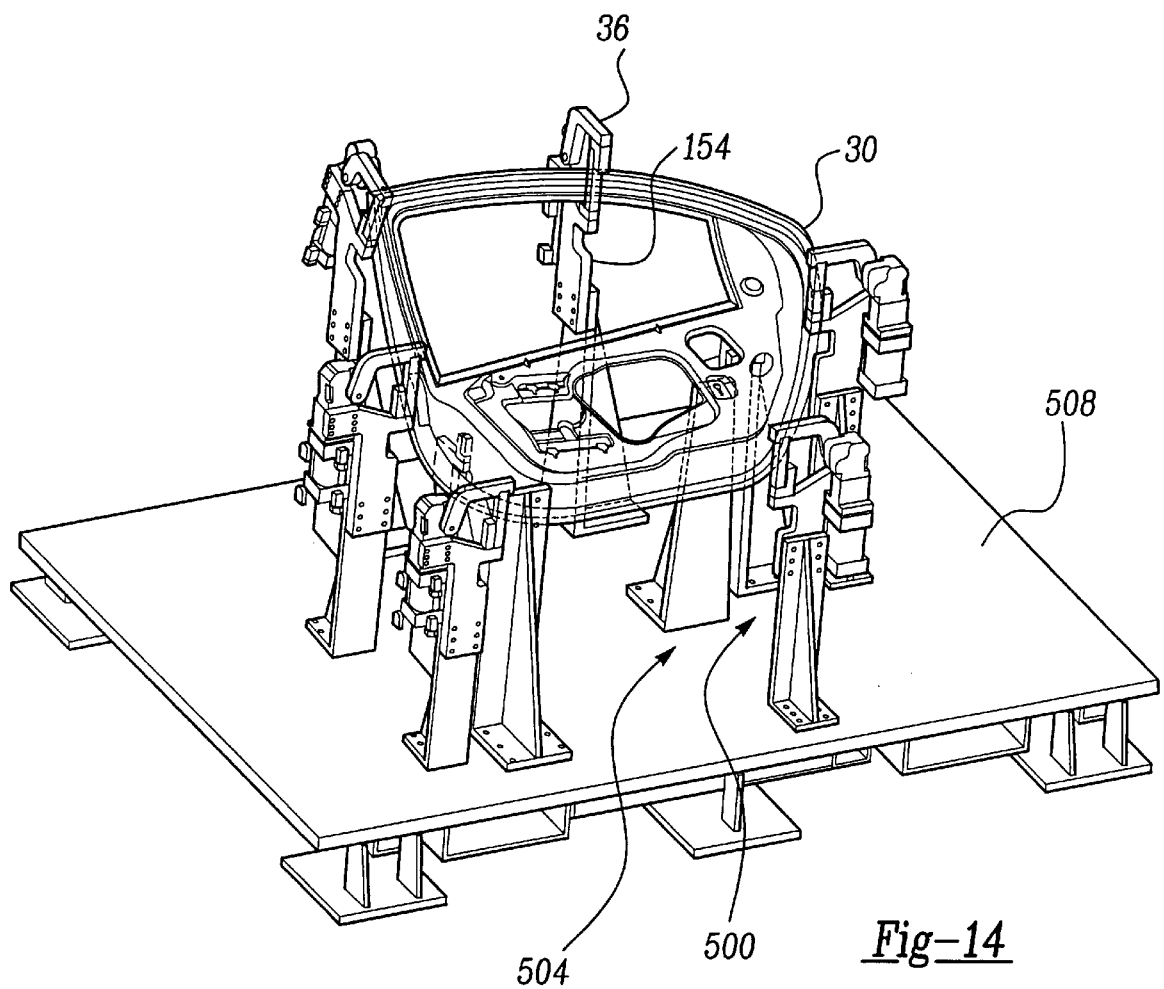
FIG. 14 is a three dimensional graphic illustrating a second possible output of the present invention.

Sample outputs are shown in FIG. 13 and FIG. 14. FIG. 13 shows a sample output of a bill of material showing a components list and part ordering information for a single selected L-unit. For example, the first row 490 in the tabular output shows the power clamp which is one component stored in the selected fixture components data store as well as to which fixture it pertains, the quantity, and the catalog from which it may be obtained. The fixture components database can be constructed to provide manufacturing information as well as fixture component availability. It should be understood that the tabular output of the present invention is not to be limited to the columns shown in FIG. 10, but is only representative of the type of textual output made possible through the present invention.

FIG. 14 shows a sample graphical three dimensional output of a fixture assembly drawing where the part 30 is held down by the clamp fixture 36. The PLPs which had been designated as requiring clamp fixtures have been provided with clamp fixtures at those locations. A rest fixture 500 is shown at PLP on the part 30 which required a rest type of fixture. Also a pin fixture 504 is shown at a PLP on the part 30 which required a pin type of fixture. These fixtures which hold the part 30 stand on base 508.

The embodiment which has been set forth above was for the purpose of illustration and was not intended to limit the invention. It will be appreciated by those skilled in the art that various changes and modifications may be made to the embodiment described in this specification without departing from the spirit and scope of the invention as defined by the appended claims.

APPENDIX A

```
;/********************************************************************
;/*** determine_arm: selects arm by offset and length.      ***
;/********************************************************************
(defun determine_arm ( / det_arm_ref_pt end_of_arm_x min_pivot_pt_x min_length_reqd
MLR
                    pivot_pt_x vert_pt1 vert_pt2 min_height_reqd offset AL MHR sq1_string )
    (princ "\ndetermine_arm\n")
    (setq det_arm_ref_pt (get_arm_attach_pt))
    (if (and (= p1p_type "PWR_CLAMPC")(<= 270 p1p_surf_angle 360))
        (progn
            (setq sq11 (strcat "SELECT DISTINCT MIN(OFFSET) INTO :MO FROM "
arm_table)
                offset (sq1_single sq11 '0)
                hor_pt1 (mapcar '- det_arm_ref_pt (list 0 offset 0))
                hor_pt2 (mapcar '- hor_pt1 '(100 0 0))
                test_pivot_pt (det_pivot_pt hor_pt1 hor_pt2)
                end_of_arm_x (- (car det_arm_ref_pt) 25);end of arm is 25mm back
                min_length_reqd (- (car test_pivot_pt) end_of_arm_x);
            )
        )
    ;else
        (progn
            (if (and (= p1p_type "PWR_CLAMPC")(< = 0 p1p_surf_angle 90))
                (setq ccp1 (round_world (set_ref_pt "pt1" p1p_ename) 1.0)
```

APPENDIX A-continued

```
                    ccc (+ (car ccp1) 95);add ninety five to the x coord. of corner clamp p1p
nearest clamp
                )
            ;else not a corner clamp
                (setq ccc 0);set ccc to zero so it's never picked below
        )
        (setq end_of_arm_x (- (car det_arm_ref_pt) 25) ;25mm from 2nd attach c1 to edge
                min_pivot_pt_x (max (set_arm_clearance) ;ensure blade width above riser. if >
120, program craps out with roof
                            (+ (car (trans max_x_world 0 1)) 50 );50mm from part edge to
pivot pt
                            ccc ;corner clamp clearance required from above
                        )
                min_length_reqd (- min_pivot_pt_x end_of_arm_x)
        )
      );end progn
    );endif
    (setq MLR (rtos min_length_reqd 2 4)
            arm_length (sq1_single (strcat "SELECT DISTINCT MIN(K) INTO :K FROM "
arm_table "WHERE K >= " MLR) '0)
    )
    (if (not arm_length)
        (progn
            (setq sq1222 (strcat "SELECT DISTINCT MAX(K) INTO :K FROM " arm_table)
                arm_length (sq1_single sq1222 '0)
            )
            (add_warning (strcat "Longest arm in database, " arm_length "mm, is still too
short."))
        )
    )
    (setq pivot_pt_x (+ arm_length end_of_arm_x)
            vert_pt1 (list pivot_pt_x 100 (caddr det_arm_ref_pt))
            vert_pt2 (list pivot_pt_x 0 (caddr det_arm_ref_pt))
            test_pivot_pt (det_pivot_pt vert_pt1 vert_pt2)
            utmost_pt (max (cadr det_arm_ref_pt)    ;point where spacer is proposed to be
                        (cadr (trans max_y_world 0 1)) ;y value of highest part extent from base
                        (cadr (trans max_x_world 0 1)) ;y value of part extent closest to clamp (if
arm attached @ 180)
                    )
            min_height_reqd (- utmost_pt (cadr test_pivot_pt));vertical distance from spacer or
part to pivot point
    )
    (setq AL (rtos arm_length 2 0)
            MHR (rtos min_height_reqd 2 0)
            offset (sq1_single (strcat "SELECT DISTINCT MIN(OFFSET) INTO :MO FROM "
arm_table " WHERE OFFSET > = " MHR)'0)
    )
    (if (not offset)
        (setq offset (sq1_single (strcat "SELECT DISTINCT MAX(OFFSET) INTO :O FROM "
arm table ) '0))
    )
    (setq sq1_string (strcat "SELECT PART_NAME INTO :PN FROM " arm_table " WHERE
K=" AL " and OFFSET= " (rtos offset 2 0))
            arm_model (rt_blanks (sq1_single sq1_string '0))
    )
)
```

APPENDIX B

```
(defun set_1wr_1block_vars 0
    (princ "\nset_1wr_1block_vars\n")
    (command "UCS" "R" "NC_BLOCK_UCS")
    (setq cur_zone1_min_y (trans zone1_min_y 0 1) ; zone1 is on part side of PLP
            cur_zone2_min_y (trans zone2_min_y 0 1) ; zone2 is on clamp side of PLP
    )cond
        ((= 1wr_1block_orient 0)      ; is 1block on part side of PLP?
        (setq sq1_string (strcat "select EXTENT1, HB3 into :EX1, :HB from "
1-block_table " where PART_NAME = :11b")
            ret (sq1_single sq1_string (list 1wr_1block))
            extent1 (read (nth 0 ret))          ; get extent1 point
value
        hb3 (red (nth 1 ret))                  ; get HB3 point value
(y value gives inner limit of 1block)
            nc_remainder                       ; set distance from nc attach point
to end of nc block
                (- (cadr hb3)                  ;   y value of HB3
```

APPENDIX B-continued

```
(inner limit of 1block)
        nc_gap)                          ;       - nc_gap
value (gap from HB3 to end of NC block)
        nc_height                        ; set nc_height to
max of:
        (max nc_default_height           ;
nc_default_height or
             (+ (- (cadr cur_zone1_min_y))) ;      lowest
y
value of part in zone (negated to get positive number)
             10                          ;       + part
clearance value
             (- (cadr extent1))          ;       + y value
of extent1 (negated to get positive number)
             nc_remainder))              ;       +
nc_remainder
        nc_attach_side (- (/ nc)width 2))   ; set attach side to
half of nc_width (negated to get negative number)
        nc_attach_pt                     ; set attach point
to:
        (list nc_attach_side             ;    x value
(negative number)
             (- (- nc_height nc_remainder)) ;  y value
(negated to get negative number)
             0)                          ;    z value
        nc_spacer_attach_pt              ; set spacer attach point to:
             (mapcar '- nc_attach_pt     ;       nc attach point
                (list nc_spacer_thk 0 0)) ;      - spacer thickness
        )
        (command "UCS" "3"               ; change UCS to:
             nc_attach_pt                ;    origin
             "@0,1,0"                    ;    x direction
(away from base)
             "@1,0,0")                   ;    y direction
(towards clamp)
        (save_part_ucs "NC_SPACER_UCS")      ; save UCS
        (command "UCS" "R" "NC_BLOCK_UCS")   ; restore nc block
UCS
        (command "UCS" "3"               ; change UCS to:
             nc_spacer_attach_pt         ;    origin
             "@1,0,0"                    ;    x direction
(towards clamp)
             "@0,-1,0")                  ;    y direction
(towards base)
        (save_part_ucs "LWR_LBLOCK_UCS")     ; save UCS
        (command "UCS" "R" "NC_BLOCK_UCS")   ; restore nc block
UCS
        )
        ((= 1wr_1block_orient 180)       ; is 1block on clamp side of
PLP?
        (setq sq1_string (strcat "select EXTENT1, HB3 into :EX1, :HB from "
             ret (sq1_single sq1_string (list 1wr_1block))
             extent1 (read (nth 0 ret))  ; get extent 1 point value
             hb3 (read (nth 1 ret))      ; get HB3 point value
(y value gives inner limit of 1block)
             nc_remainder                ; set distance from nc attach point
to end of nc block
             (- (cadr hb3)               ;    y value of HB3
(inner limit of 1block)
             nc_gap)                     ;       - nc_gap
value (gap from HB3 to end of NC block)
             nc_height                   ; set nc_height to max of:
             (max nc_default_height      ;
nc_default_height or
                  (+ (- (cadr cur_zone_min_y))) ;   lowest
y
value of part in zone (negated to get positive number)
             10                          ;       + part
clearance value
             (- (cadr extent1))          ;       + y value
of extent1 (negated to get positive number)
             nc_remainder))              ;       +
nc_remainder
        nc_attach_side (/ nc_width 2)    ; set attach side to
half of nc_width (positive number)
        nc_attach_pt                     ; set attach point to:
             (list nc_attach_side        ;    x value
(positive number)
             (- (- nc_height nc_remainder)) ;  y value
```

APPENDIX B-continued

```
(negated to get negative number)
            0)                                  ;   z value
      nc_spacer_attach_pt                       ; set spacer attach point to:
         (mapcar '+ nc_attach_pt                ;      nc attach point
              (list nc_spacer_thk 0 0))    ;         + spacer
thickness
      )
      (command "UCS" "3"                        ; change UCS to:
          nc_attach_pt                          ;   origin
          "@0,1,0"                              ;   x direction
(away from base)
          "@-1,0,0")                            ;   y direction
(towards part)
          (save_part_ucs "NC_SPACER_UCS")       ; save UCS
          (command "UCS" "R" "NC_BLOCK_UCS")    ; restore nc block
UCS
      (command "UCS" "3"                        ; change UCS to:
          nc_spacer_attach_pt                   ;   origin
          "@-1,0,0"                             ;   x direction
(towards part)
          "@0,-1,0">                            ;   y direction
(toward base)
          (save_part_usc "LWR_LBLOCK_UCS")      ; save UCS
          (command "UCS" "R" "NC_BLOCK_UCS")    ; restore nc block
UCS
      )
   )
)
```

We claim:

1. A computer-implemented apparatus for constructing a fixture to hold a physical part, said fixture comprising L-unit components, said L-unit components and said part having geometric dimensional characteristics, comprising:

a fastening locations database for storing fastening locations of said part;

a L-unit components database for storing geometric dimensional characteristics of said L-unit components;

a part section database for storing geometric dimensional characteristics of said part;

a L-unit generation,rule system having L-unit generation rules which establish criteria for selecting said L-unit components based on said geometric dimensional characteristics of said part and on said fastening locations; and a L-unit comparator module coupled to said part section database and to said fastening locations database and to said components database and to said L-unit generation rule system for selecting said L-unit components from said L-unit components database which satisfy said criteria to hold said part.

2. The Apparatus according to claim 1 wherein said part is a part of a car.

3. The Apparatus according to claim 1 wherein said geometric dimensional characteristics include line segment data and curvilinear data for delineating said part.

4. The Apparatus according to claim 1 wherein said L-uint comparator module uses database means for selecting said L-unit components.

5. The Apparatus according to claim 1 wherein said fastening locations use principal locating points (PLP) to identify locations on said part for fastening.

6. The Apparatus according to claim 1 wherein said fixture components include clamp L-unit components, said clamp L-unit components including an upper Numerical Control machined (NC) block, a lower NC block, a clamp, a riser bracket, a blade, a clamp, an upper L-block and a lower L-block.

7. The Apparatus according to claim 6 wherein said L-unit generation rules include setting orientation of said upper and lower L-blocks based on surface angle of said part, said surface angle being determined from said geometric dimensional characteristics of said part.

8. The Apparatus according to claim 7 wherein said L-unit generation rules include determining geometric characteristics of said part by incrementing a predetermined distance from said fastening locations.

9. The Apparatus according to claim 7 wherein said L-unit generation rules include determining dimensions for a blade of said clamp L-unit based on lowest portion of said part and on position of said lower L-block and on position of said clamp and on position of said riser bracket.

10. The Apparatus according to claim 7 wherein said L-unit generation rules include selecting said arm of said clamp L-unit from said L-unit components database based on position of said L-block relative to said arm for providing connection between said L-block and said arm and based on position of said arm relative to said clamp for providing clearance of said arm relative to said clamp.

11. The Apparatus according to claim 1 wherein said L-unit components include pin L-unit components, said pin L-unit components including a pin, a pin retainer, a first spacer, a second spacer, a riser bracket, and a blade, and wherein said part includes an opening for receiving said pin.

12. The Apparatus according to claim 11 wherein said L-unit generation rules include selecting said pin from said L-unit components database which has a diameter which substantially matches the diameter of the opening of said part.

13. The Apparatus according to claim 1 wherein said L-unit components include rest L-unit components, said rest L-unit components including a Numerical Control machined (NC) block, a L-block, a first spacer, a second spacer, a riser bracket, and a blade and wherein said part rests upon said NC block.

14. The Apparatus according to claim 13 wherein said L-unit generation rules include determining an NC block based upon surface of said part.

15. A method for constructing a fixture to hold a physical part, said fixture comprising various L-units, said L-units comprising L-unit components, said L-unit components and said part having geometric dimensional characteristics, comprising:

storing fastening locations of said part in a fastening locations database;

storing geometric dimensional characteristics of said L-unit components in a L-unit components database;

storing geometric dimensional characteristics of said part in a part section database; and selecting said L-unit components to hold said part based on criteria established by a L-unit generation rule system, said L-unit generation rule system having L-unit generation rules for comparing both said geometric dimensional characteristics of said part and said fastening locations with said geometric characteristics of L-unit components stored in said L-unit components database, said L-unit generation rules including determining geometric characteristics of said part by incrementing a predetermined distance from at least one of said fastening locations.

16. The Method according to claim 15 wherein said part is a part of a car.

17. The Method according to claim 15, wherein said geometric dimensional characteristics include line segment data and curvilinear data for delineating said part.

18. The Method according to claim 15 further comprising the step of using database querying operations for selecting said L-unit components.

19. The Method according to claim 15 wherein said fastening locations use principal locating points (PLP) to identify said fastening locations.

20. The Method according to claim 15 wherein said L-unit components include clamp L-unit components, said clamp L-unit components including an upper Numerical Control (NC) block, a lower NC block, a clamp, a riser bracket, a blade, a clamp, an upper L-block and a lower L-block.

21. The Method according to claim 20 wherein said L-unit generation rules include setting orientation of said upper and lower L-blocks based on surface angle of said part, said surface angle being determined from said geometric dimensional characteristics of said part.

22. The Method according to claim 21 wherein said L-unit generation rules include determining dimensions for an NC block of said clamp L-unit based on part contour.

23. The Method according to claim 21 wherein said L-unit generation rules include determining dimensions for a blade of said clamp L-unit based on lowest portion of said part and on position of said lower L-block and on position of said clamp and on position of said riser bracket.

24. The Method according to claim 21 wherein said L-unit generation rules include selecting said arm of said clamp L-unit from said L-unit components database based on position of said L-block relative to said arm for providing connection between said L-block and said arm and based on position of said arm relative to said clamp for providing clearance of said arm relative to said clamp.

25. The Method according to claim 15 wherein said L-unit components include pin L-unit components, said pin L-unit components including a pin, a pin retainer, a first spacer, a second spacer, a riser bracket, and a blade, and wherein said part includes an opening for receiving said pin.

26. The Method according to claim 25 wherein said L-unit generation rules include selecting said pin from said L-unit components database which has a diameter which substantially matches the opening of the hole of said part.

27. The Method according to claim 15 wherein said L-unit components include rest L-unit components, said rest L-unit components including a Numerical Control (NC) block, a L-block, a first spacer, a second spacer, a riser bracket, and a blade and wherein said part rests upon said NC block.

28. The Method according to claim 27 wherein said L-unit generation rules include determining an NC block based upon surface of said part.

29. A computer-implemented apparatus for constructing a fixture to hold a physical part, said fixture comprising L-unit components, said L-unit components and said part having geometric dimensional characteristics, comprising:

a fastening locations database for storing fastening locations of said part;

a L-unit components database for storing geometric dimensional characteristics of said L-unit components, said components being selecting from the group consisting of clamp L-unit components, pin L-unit components, rest L-unit components, and combinations thereof;

a part section database for storing geometric dimensional characteristics of said part;

a L-unit generation rule system having L-unit generation rules which establish criteria for selecting said L-unit components based on said geometric dimensional characteristics of said part and on said fastening locations; and a L-unit comparator module coupled to said part section database and to said fastening locations database and to said components database and to said L-unit generation rule system for selecting said L-unit components from said L-unit components database which satisfy said criteria to hold said part.

30. The Apparatus according to claim 29 wherein said clamp L-unit components are selected from the group consisting of an upper Numerical Control machined (NC) block, a lower NC block, a clamp, a riser bracket, a blade, a clamp, an upper L-block and a lower L-block, and combinations thereof.

31. The Apparatus according to claim 30 wherein said L-unit generation rules include setting orientation of said upper and lower L-blocks based on surface angle of said part, said surface angle being determined from said geometric dimensional characteristics of said part.

32. The Apparatus according to claim 31 wherein said L-unit generation rules include determining geometric characteristics of said part by incrementing a predetermined distance from said fastening locations.

33. The Apparatus according to claim 29 wherein said L-unit generation rules include determining geometric characteristics of said part by incrementing a predetermined distance from said fastening locations.

34. The Apparatus according to claim 31 wherein said L-unit generation rules include determining dimensions for a blade of said clamp L-unit based on lowest portion of said part and on position of said lower L-block and on position of said clamp and on position of said riser bracket.

35. The Apparatus according to claim 31 wherein said L-unit generation rules include selecting said arm of said clamp L-unit from said L-unit components database based on position of said L-block relative to said arm for providing connection between said L-block and said arm and based on position of said arm relative to said clamp for providing clearance of said arm relative to said clamp.

36. The Apparatus according to claim 29 wherein said pin L-unit components are selected from the group consisting of a pin, a pin retainer, a first spacer, a second spacer, a riser bracket, a blade, and combinations thereof;

and wherein said part includes an opening for receiving said pin.

37. The Apparatus according to claim 36 wherein said L-unit generation rules include selecting said pin from said L-unit components database which has a diameter which substantially matches the diameter of the opening of said part.

38. The Apparatus according to claim 29 wherein said rest L-unit components are selected from the group consisting of a Numerical Control machined (NC) block, a L-block, a first spacer, a second spacer, a riser bracket, a blade, and combinations thereof;

and wherein said part rests upon said NC block.

39. The Apparatus according to claim 38 wherein said L-unit generation rules include determining an NC block based upon surface of said part.

40. The Apparatus according to claim 29 wherein said L-unit comparator module determines the surface angle of said part based upon said stored geometric dimensional characteristics of said part; said L-unit generation rules including selecting at least one of said L-unit components from said L-unit components database based upon said determined surface angle of said part.

\* \* \* \* \*